(12) United States Patent
Bernt et al.

(10) Patent No.: US 10,435,481 B2
(45) Date of Patent: Oct. 8, 2019

(54) REGENERATED CELLULOSE FIBER

(75) Inventors: Ingo Bernt, Regensburg (DE); Konrad Brunner, Kelheim (DE); Matthew North, Bad Abbach (DE); Reinhold Röthenbacher, Pentling (DE); Walter Roggenstein, Bad Abbach (DE); Roland Scholz, Regensburg (DE)

(73) Assignee: KELHEIM FIBRES GMBH, Kelheim (DE)

( * ) Notice: Subject to any disclaimer, the term of this patent is extended or adjusted under 35 U.S.C. 154(b) by 878 days.

(21) Appl. No.: 14/232,776

(22) PCT Filed: Jun. 26, 2012

(86) PCT No.: PCT/EP2012/062374
§ 371 (c)(1),
(2), (4) Date: Jan. 14, 2014

(87) PCT Pub. No.: WO2013/010759
PCT Pub. Date: Jan. 24, 2013

(65) Prior Publication Data
US 2014/0154507 A1    Jun. 5, 2014

(30) Foreign Application Priority Data

Jul. 15, 2011  (EP) ..................................... 11174142

(51) Int. Cl.
*D01F 2/06* (2006.01)
*C08B 16/00* (2006.01)
(Continued)

(52) U.S. Cl.
CPC .......... *C08B 16/00* (2013.01); *B29D 99/0078* (2013.01); *D01D 5/253* (2013.01); *D01F 2/06* (2013.01); *Y10T 428/2922* (2015.01)

(58) Field of Classification Search
CPC .... B29D 99/0078; C08B 16/00; D01D 5/253; D01F 2/06; H01R 39/39; Y10T 428/2922
(Continued)

(56) References Cited

U.S. PATENT DOCUMENTS

| 4,129,679 A | 12/1978 | Woodings |
| 4,362,159 A | 12/1982 | Sakurai et al. |

(Continued)

FOREIGN PATENT DOCUMENTS

| EP | 0 301 874 A1 | 1/1989 | |
| EP | 2280098 A1 * | 7/2009 | ............ D01D 5/247 |

(Continued)

OTHER PUBLICATIONS

Extended European Search Report issued in EP 11 17 4142, filed Dec. 7, 2011 (2 pages).
(Continued)

*Primary Examiner* — Arti Signh-Pandey
(74) *Attorney, Agent, or Firm* — Venable LLP (57) ABSTRACT

The present invention relates to a regenerated cellulose fiber having a multi-limbed cross-section. The fiber according to the invention is characterized in that the cross-section is formed of at least two multi-limbed basic shapes (1', 2', 3', 4'), which basic shapes are connected, in each case at least at one of their limb ends, to the limb end of another basic shape and the length of the connecting limb (12) resulting from the connection of the two limb ends is longer than the length of the shortest one of the other limbs by a factor of at least 1.5, preferably of from 1.5 to 2.0.

21 Claims, 5 Drawing Sheets

(51) Int. Cl.
*D01D 5/253* (2006.01)
*B29D 99/00* (2010.01)

(58) Field of Classification Search
USPC .............................................. 264/6; 428/369
See application file for complete search history.

(56) References Cited

U.S. PATENT DOCUMENTS

| | | |
|---|---|---|
| 5,458,835 A | 10/1995 | Wilkes et al. |
| 5,634,914 A | 6/1997 | Wilkes et al. |
| 6,403,217 B1 | 6/2002 | Phillips et al. |
| 2007/0026228 A1* | 2/2007 | Hartmann .................. D01F 1/08 428/402.2 |
| 2012/0209234 A1* | 8/2012 | Bernt ........................ D01F 2/06 604/372 |

FOREIGN PATENT DOCUMENTS

| | | |
|---|---|---|
| GB | 1 333 047 A | 10/1973 |
| JP | H05-156562 A | 6/1993 |
| WO | 2004005595 A1 | 1/2004 |
| WO | 2004085720 A1 | 10/2004 |

OTHER PUBLICATIONS

International Search Report for PCT/EP2012/062374, dated Sep. 11, 2011 (2 pages).
R. Mather et al., "The Chemistry of Textile Fibres," The Royal Society of Chemistry, 2nd Ed., pp. 409-410 (2015).

\* cited by examiner

REGENERATED CELLULOSE FIBER

BACKGROUND OF THE INVENTION

Field of the Invention

The present invention relates to a regenerated cellulose fiber which is obtained by the viscose process.

For sanitary applications such as, for example, tampons or absorbent bodies in general, fibers with a particularly high liquid storage capacity are desirable in order to thus allow an absorption capacity as high as possible of the sanitary product.

Fiber materials according to the prior art which usually are used for the production of tampons are regular viscose fibers, so-called trilobal viscose fibers and cotton. The specific absorption capacity of said fibers according to the so-called Syngina test as described further below is about 4.0 g/g for cotton, 4.5 g/g for regular viscose and 5.2 g/g for trilobal viscose fibers.

The aim of tampon producers is to achieve a particular degree of absorption with a minimum expenditure of fiber material and money.

While cotton is slowly becoming obsolete as a fiber material for tampons because of its insufficient absorption capacity, trilobal fibers are much more expensive to produce and it is far more difficult to process them into tampons, as compared to regular viscose.

Many different approaches for increasing the absorption capacity of cellulose fibers have been reported:

1. a chemical modification by grafting monomers onto the cellulose fiber
2. a chemical modification by incorporating absorbent polymers such as carboxymethyl cellulose, chitosan, cellulose carbamate, alginate or guaran into the cellulose fiber matrix
3. a physical modification of the fibers such as, e.g., hollow fibers or collapsed hollow fibers, as known, for example, from U.S. Pat. No. 4,129,679, or
4. multi-limbed fibers (so-called "trilobal" fibers) which are obtained by using spinnerets having multi-limbed extrusion holes with at least 3 limbs having a length-to-width ratio of 2:1 to 10:1, as known, for example, from EP-A1 0 301 874.

The disadvantage of a chemical modification of the cellulose fiber is that a costly and time-consuming toxicological and physiological test procedure is necessary for very delicate medical applications such as those of tampons and the occurrence of the toxic shock syndrome (TSS) keeps most tampon producers from using chemically modified fiber materials although the chemicals are possibly regarded as safe.

The disadvantage of hollow fibers and collapsed hollow fibers is that they are difficult to produce because of their high water retention capacity, as a result of which the fibers swell strongly during washing and adhere to each other during drying because of the formation of hydrogen bonds, which makes them brittle in the dry state, soapy in the wet state and renders it difficult to break them up and process them into a carded fabric.

In recent years, the use of multi-limbed, in particular trilobal fibers has experienced a steady increase.

The production of multi-limbed viscose fibers has been described, for example, in the U.S. Pat. Nos. 5,634,914 and 5,458,835 and in EP-A1 0 301 874. The process disclosed therein describes the spinning of a commonly used viscose, which may contain a certain amount of a modifier known from prior art, through extrusion holes of a multi-limbed shape, in particular a trilobal shape, into a conventional spinning bath. The essential feature of said process is that the shape of the multi-limbed extrusion holes in the spinneret is similar to the desired shape of the cross-section of the filaments. According to the teachings of those documents, the geometry of the spinneret hole determines the shape of the fiber cross-section, and a particular length-to-width ratio of the fiber cross-section can be obtained by designing the extrusion holes appropriately.

Moreover, the prior art with regard to multi-limbed fibers teaches that such multi-limbed fibers have an absorption capacity which is enhanced in comparison to that of viscose fibers according to the prior art, namely in particular in tampons, and that such fibers must have at least 3 limbs and that each limb of those fibers must exhibit a length-to-width ratio of at least 2:1, most preferably of from 3:1 to 5:1. The larger the length-to-width ratio, the higher would be the proportion of free volume and the absorption capacity of the fibers, provided that the limbs are not so long and thin that they will bend back onto themselves.

In those documents, it is also mentioned that, under the conditions of slow regeneration spinning, even higher absorption capacities of the multi-limbed fibers can be achieved, for example, by lowering the acid level and/or increasing the sulphate level and/or adding a viscose modifier.

The fact that hollow spaces in the cross-section of viscose fibers increase the absorption capacity of said fibers and of the products produced therefrom is furthermore known from U.S. Pat. No. 4,362,159.

From WO 2004/085720 A, a solid regenerated standard viscose fiber is known which has a cross-section the area of which is larger than the area of the largest equilateral triangle inscribed into said cross-section by a factor of less than 2.50 times, preferably less than 2.40 times, particularly preferably less than 2.25 times, and which exhibits a Syngina absorption capacity of more than 6.0 g/g fiber, as defined below.

WO 2004/005595 A describes an absorbent standard viscose fiber having an irregularly lobed cross-section. Further viscose fibers with irregular cross-sections are described in U.S. Pat. No. 4,129,679 and GB-A 1,333,047.

U.S. Pat. No. 6,403,217 B1 describes a variety of die configurations for the production of fibers having modified fiber cross-sections according to the melt spinning process. Melt spinning processes differ fundamentally from the wet spinning process used in the viscose process.

Furthermore, it is known that an increase in the fiber titer normally leads to an increase in the absorbency of the fiber, since thicker fibers are stiffer and, hence, the pores in the absorbent article made up of the fibers will collapse less quickly. However, the possibility of increasing the absorption capacity in particular in multi-limbed fibers by increasing the titer is limited.

The need for improved absorbent cellulose fibers still exists. In particular, there is a need for multi-limbed cellulose fibers with an increased titer.

The present invention achieves said object with a regenerated cellulose fiber having a multi-limbed cross-section which is characterized in that the cross-section is formed of at least two multi-limbed basic shapes, which basic shapes are connected, in each case at least at one of their limb ends, to the limb end of another basic shape and the length of the connecting limb resulting from the connection of the two limb ends is longer than the length of the shortest one of the other limbs by a factor of at least 1.5, preferably of from 1.5 to 2.0.

The object of the invention is also achieved by a fiber bundle which contains a plurality of cellulose fibers according to the invention.

Further aspects of the present invention relate to a process for the production of the cellulose fiber according to the invention as well as to the use of the cellulose fiber according to the invention and of the fiber bundle according to the invention.

DETAILED DESCRIPTION OF THE INVENTION

The present invention starts out from the problem that, in multi-limbed cellulose fibers, a mere increase in the fiber titer by spinning a thicker fiber with the cross-sectional shape remaining the same does not bring about improved properties with regard to the absorbency of the fibers.

The present invention achieves said object in that, instead of an increase in the titer by proportionally increasing the fiber cross-section, a multiplication of the fiber cross-section occurs. Thus, multi-limbed basic shapes known per se are connected to each other at their limb ends so that a larger fiber thus having a higher titer emerges. As a result of the measure that the length of the connecting limb resulting from the connection of the two limb ends is longer than the length of the shortest one of the other limbs by a factor of at least 1.5, preferably of from 1.5 to 2.0, the distance between the fiber centers is increased considerably, whereby large hollow spaces are produced when several fibers are attached to each other.

Preferably, the basic shapes are selected from the group consisting of Y-shaped basic shapes, X-shaped basic shapes and mixtures thereof. Y-shaped, i.e., "trilobal" basic shapes are particularly preferred.

Figure 1:
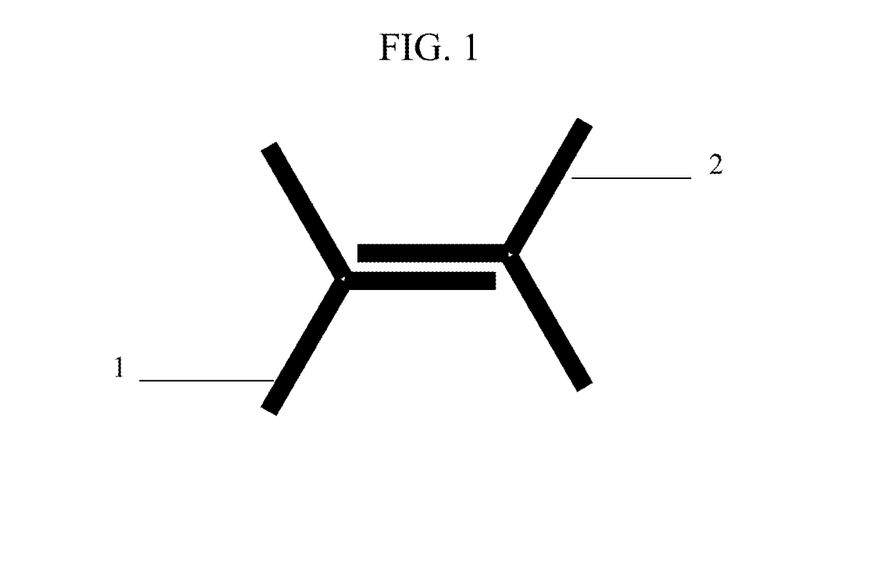
FIG. 1 schematically shows the arrangement of two fibers having a Y-shaped fiber cross-section (prior art).

FIG. 1 shows the arrangement of two fibers 1, 2 having conventional trilobal cross-sectional shapes. By the limbs of the fiber, the fiber centers are kept at a large distance so that structures with a large liquid storage capacity are formed.

Figure 2:
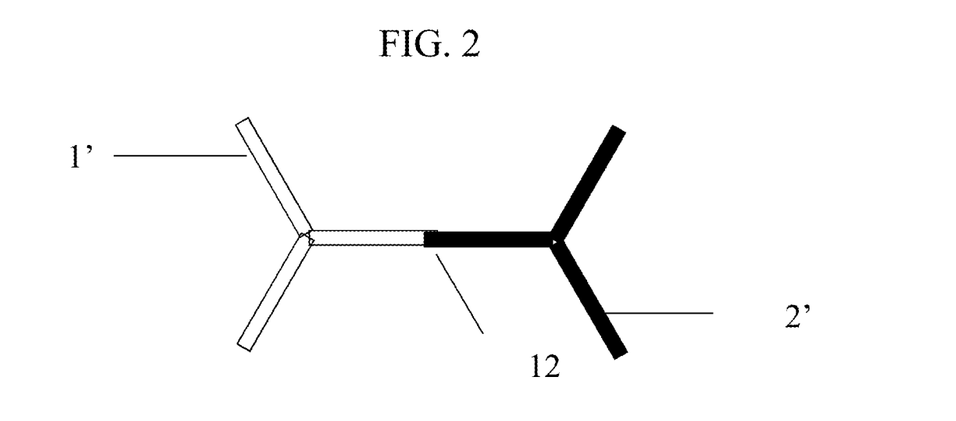
FIG. 2 schematically shows the cross-section of an embodiment of the fiber according to the invention having two multi-limbed basic shapes connected to each other at the end of one of their limbs.

FIG. 2 shows a fiber according to the invention consisting of two trilobal basic shapes 1', 2' which are connected to each other at the ends of one of their limbs (which, for illustrative purposes, are depicted in black and white, respectively). It is immediately visible that, in this case, the distance between the two Y-shaped basic elements is considerably increased in comparison to the trilobal fiber of the prior art (FIG. 1). As schematically illustrated in FIG. 2, the length of the connecting limb 12 produced by the connection of the limbs is greater than the length of the remaining limbs by a factor of preferably from 1.5 to 2.0.

Figure 3:
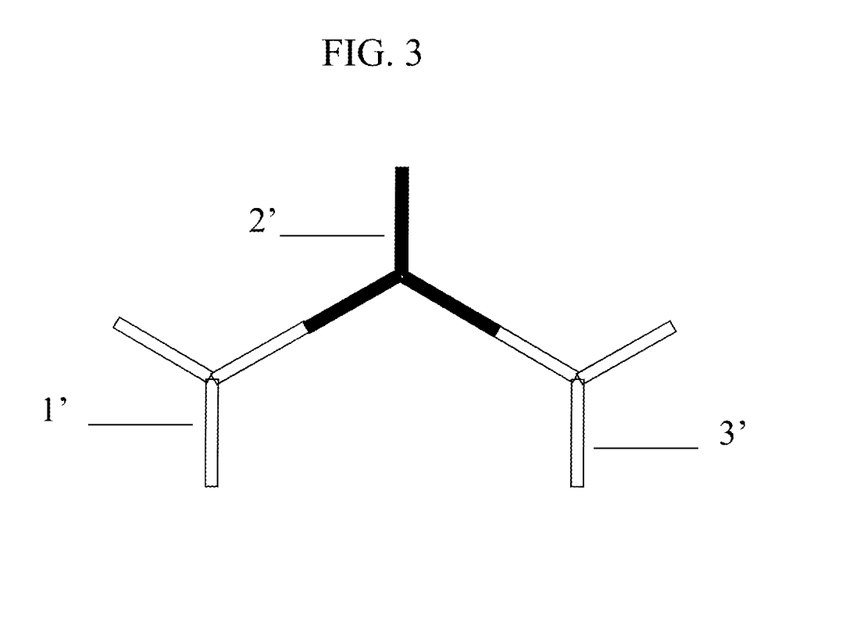
FIG. 3 schematically shows the cross-section of an embodiment of the fiber according to the invention having three multi-limbed basic shapes connected to each other at the end of one of their limbs.
Figure 4:
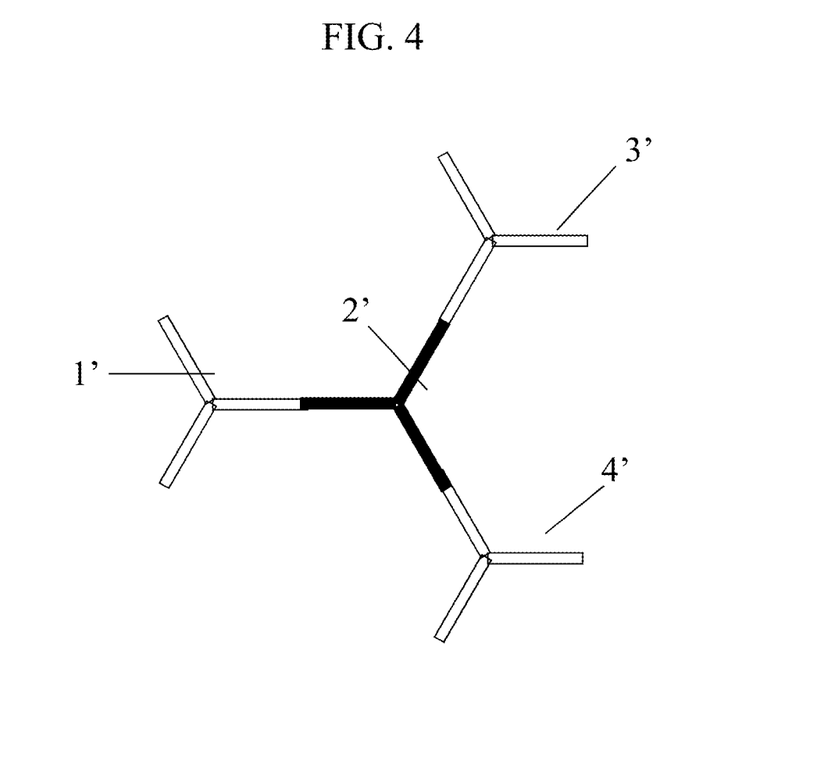
FIG. 4 schematically shows the cross-section of an embodiment of the fiber according to the invention having four multi-limbed basic shapes connected to each other at the end of one of their limbs.

As shown in FIGS. 3 and 4, this effect can even be enhanced by arranging more than two basic shapes, e.g., three basic shapes 1', 2', 3' (FIG. 3) or four basic shapes 1', 2', 3', 4' (FIG. 4), respectively.

The more basic shapes are connected to each other, the higher is the titer of the resulting fiber (with the initial basic shape having the same size).

The number of basic shapes connected to each other preferably ranges from 2 to 10, particularly preferably from 2 to 4.

By the fiber structure according to the invention, hollow spaces are thus produced which are suitable for the storage of liquid and are stable, i.e., are unable to collapse due to the stiffness of the limbs of the fiber.

Figure 5:
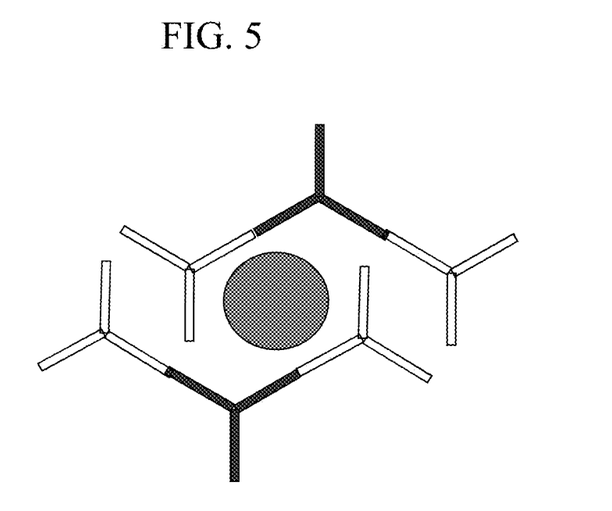
FIG. 5 schematically shows the formation of hollow spaces in fibers according to the invention which, in each case, are composed of three basic shapes.
Figure 6:
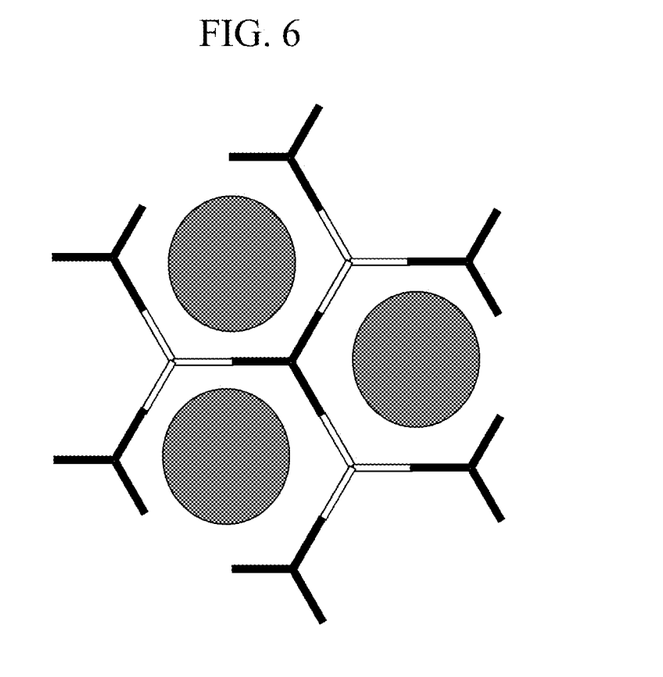
FIG. 6 schematically shows the formation of hollow spaces in a fiber according to the invention which is composed of 10 basic shapes.

This is schematically illustrated in FIG. 5 (in this case: arrangement of two fibers which, in each case, are composed of three Y-shaped basic shapes) as well as in FIG. 6 (in this case: a fiber made up of 10 Y-shaped basic shapes connected to each other).

Preferably, the basic shapes connected to each other are arranged in the fiber according to the invention in such a way that the cross-section of the fiber exhibits at least one axis of symmetry as shown, for example, in the embodiments of FIGS. 2, 3 and 4.

Preferably, in a manner known per se, at least a portion of the limbs of the fiber, preferably all the limbs, have a ratio of length to width of from 2:1 to 10:1.

The fiber titer of the fiber according to the invention preferably ranges from 2 dtex to 40 dtex, particularly preferably from 6 to 16 dtex. Conventional trilobal cellulose fibers exhibit a titer of typically from 3 to 4 dtex. The fiber according to the invention can exhibit a titer which is considerably higher compared to that, with the properties for an application in absorbent articles simultaneously being improved or, respectively, remaining at least equivalent.

The cellulose fiber according to the invention can be provided in the form of a staple fiber, a short-cut fiber or in the form of a filament tow.

In a further preferred embodiment, the cellulose fiber according to the invention can be an asymmetrical fiber, wherein at least one of the limbs of a basic shape deviates in its length from the other limbs and wherein the length of one or several limbs is greater than the length of the shortest limb(s) by a factor of 2 to 10.

It has been shown that, when a plurality of such asymmetrical fibers are pressed at an equal degree of pressure, a product having a lower density results, which is advantageous for absorbent products since the absorbency decreases linearly with an increasing density. In addition, such asymmetrical fibers exhibit an improved crimp.

Preferably, in the asymmetrical cellulose fiber according to the invention in all basic shapes thereof, all limbs differ from each other with regard to their lengths. Such fibers are herein referred to as "completely asymmetrical" cellulose fibers.

In each of the asymmetrical cellulose fibers, at least one of the limbs can preferably deviate from the other limbs also with regard to its width. In this case, in each of said asymmetrical cellulose fibers, the width of one or several limbs can be greater than the width of the narrowest limb by a factor of 1.1 to 5.

Within a basic shape, the angle between the limbs of the asymmetrical cellulose fiber can have from 80° to 140°.

Figure 7:
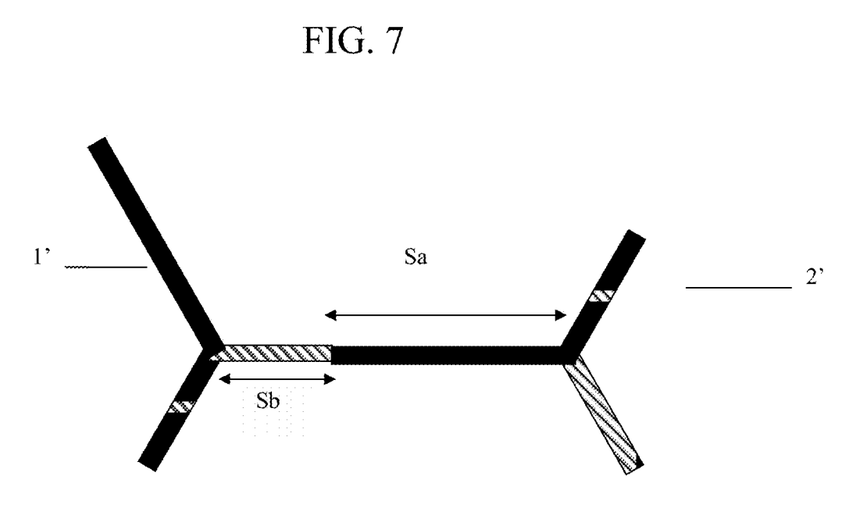
FIG. 7 schematically shows the cross-section of a fiber according to the invention which is composed of two asymmetrical multi-limbed fibers.

FIG. 7 schematically shows an example of a fiber according to the invention which is composed of two asymmetrical basic shapes 1' and 2', which, in each case, comprise a longer limb (of a limb length Sa) and two shorter limbs of the same length (limb length Sb).

The present invention also relates to a fiber bundle containing a plurality of cellulose fibers according to the invention in the form of cellulose staple fibers.

A plurality of fibers can be understood as a "fiber bundle", for example, spun rayon (a plurality of staple fibers), a strand of continuous filaments or a bale of fibers.

In the fiber bundle according to the invention, the cross-sections of the cellulose fibers contained therein are preferably essentially equal. Thus, a plurality of cellulose fibers having essentially the same cross-sectional structure (for example, made up, in each case, of three basic shapes connected to each other) is provided.

If, as described above, the fiber bundle comprises asymmetrical fibers, preferably at least 10%, particularly preferably at least 20%, most preferably at least 50%, of the multi-limbed fibers contained in the fiber bundle are asymmetrical fibers. Preferably, all of the fibers contained in the fiber bundle are asymmetrical fibers. Particularly preferably, the cross-sections of all the asymmetrical fibers contained in the fiber bundle are essentially equal.

The fiber bundle may contain further fibers, for example, cellulose fibers which are not multi-limbed, but also fibers of a different origin, e.g., from other polymers.

The process for the production of the regenerated cellulose fiber according to the invention and, respectively, of the fiber bundle according to the invention comprises the steps of providing a viscose spinning mass
spinning the viscose spinning mass through at least one opening of a spinneret into a spinning bath, whereby filaments are formed,
characterized in that the opening of the spinneret is formed of at least two multi-limbed sub-openings, which sub-openings are connected, in each case at the end of at least one of their limbs, to the end of the limb of another sub-opening or come so close to said limb end that the emerging filaments will interconnect at the limb ends which have been formed.

Thus, a spinneret known per se and having, for example, trilobal spinning openings is modified in such a way that in each case several, preferably 2 to 4, trilobal spinning openings are arranged so closely to each other that, during the spinning of the viscose, the resulting Y-shaped fibers will fuse at their limb ends to the limb ends of the adjacent fiber and, hence, will form the fiber according to the invention which is composed of several Y-shaped basic shapes.

In order to achieve the length of the connecting limb, which, according to the invention, is greater than the length of the shortest limb by a factor of at least 1.5, the limbs of the sub-openings are to be dimensioned in an appropriate way.

Optionally, the process according to the invention may comprise the step of mixing the fibers produced by the process with other fibers, for example, conventional multi-limbed fibers, fibers which are not multi-limbed and/or fibers of a different origin, e.g., from other polymers.

Preferably, the process according to the invention is configured such that the spinneret comprises several openings, with all the openings having essentially the same arrangement of sub-openings. As a result, the preferred configuration, namely that all fibers have essentially the same cross-section, is achieved, for example, in a fiber bundle consisting of fibers according to the invention.

For the generation of asymmetrical basic shapes, as described above, the viscose spinning mass is spun through openings in which at least one of the limbs deviates in its length from the other limbs, with the length of one or several limbs of the openings being greater than the length of the shortest limb(s) by a factor of 2 to 10.

Furthermore, the invention relates to the use of a regenerated cellulose fiber according to the invention and, respectively, of the fiber bundle according to the invention in absorbent products, sanitary products, in particular tampons, incontinence products, sanitary pads and panty liners, filling materials for blankets, cushions and sleeping bags, packings for foodstuff, in particular for meat products, papers, in particular filter papers, flock, clothing, in particular inlay fleece, and wound dressings.

For use in papers, the fiber according to the invention is suitable in particular in the form of short-cut fibers.

In the clothing sector, the fiber according to the invention is suitable in particular in clothing textiles for moisture management, optionally mixed with other fibers or as a multi-layered structure.

EXAMPLES

Example 1

Under comparable conditions, a Y-fiber with a titer of 3.3 dtex and 6.4 dtex is spun out. The symmetry of the fiber has thereby not been changed, the cross-sectional area is merely increased proportionally.

Subsequently, an absorbent body is produced from the fibers, and the expansion capacity as well as the absorption capacity (Syngina test according to EDANA/INDA Standard Test Methods for the Nonwovens and Related Industries ERT 350.0 and WSP 350.1, respectively) are tested on said body.

The results are summarized in the following table:

| Fibre type | Max. expansion [ml] | expansion speed [ml/5.55 g] | WHV [g/g] | WRHV [%] | stability* [mm] | Syngina [g/g] | Syngina corrected [g/g] |
|---|---|---|---|---|---|---|---|
| Y-fiber 3.3dtex | 9.86 | 5.39 | 25.00 | 89.70 | 11.47 | 4.69 | 4.75 |
| Y-fiber 6.4dtex | 10.14 | 7.06 | 19.10 | 78 | 17.22 | 4.81 | 4.29 |

The examination shows that absorbent bodies made of fibers with a higher titer expand slightly further and considerably faster, which is attributable to the desired stiffening of the fibers. Said stiffening is also noticeable during the dry expansion (stability) of the absorbent body, which increases by about 50%. Said effect is normally undesirable, since it hampers the production of a pressed absorbent body in the desired dimensions.

However, during the measurement of the water holding capacity and also of the water retention capacity (that is, without pressure and under a very high pressure), a considerable decrease in the absorption capacity of the fiber having a higher titer is noticeable, which is attributable to the coarser pore structure caused by the higher titer.

In the Syngina measurement, the fiber having the higher titer initially indeed achieves a better result. However, this measurement depends on the density of the test specimen. If the result is corrected by an experimentally determined factor (of 0.1 g/g per 2 mm stability, starting from a base value of 12 mm), it is shown (see column "Syngina corrected") that the fiber having the higher titer has a lower density-specific absorption capacity.

Example 2

Under comparable conditions, a fiber according to the invention composed of two Y-shaped basic shapes ("double-Y") (see FIG. 2) and having a titer of 6.5 dtex and 10.7 dtex, respectively, is spun out. The fibers of Example 1, which were also spun out under comparable conditions, serve as reference samples. The geometries of the basic Y shapes of the fibers of Example 2 roughly matched the corresponding Y-cross-sections of Example 1.

The "double-Y" fiber of 6.5 dtex can thus be imagined as being composed of two of the Y-fibers of 3.3 dtex of Example 1.

The "double-Y" fiber of 10.7 dtex can be imagined as being composed of two of the Y-fibers of 6.4 dtex of Example 1.

The fiber samples are subjected to the same tests as those of Example 1. The results are summarized in the following table:

| Fibre type | Max. expansion [ml] | expansion speed [ml/5.55 g] | WHV [g/g] | WRHV [%] | stability* [mm] | Syngina [g/g] | Syngina corrected [g/g] |
|---|---|---|---|---|---|---|---|
| Y-fiber 3.3dtex | 9.86 | 5.39 | 25.00 | 89.70 | 11.47 | 4.69 | 4.75 |
| Y-fiber 6.4dtex | 10.14 | 7.06 | 19.10 | 78 | 17.22 | 4.81 | 4.29 |
| double-Y 6.5dtex | 10.97 | 5.66 | 23.80 | 91.20 | 11.02 | 4.78 | 4.87 |
| double-Y 10.7dtex | 10.86 | 6.93 | 24.60 | 82 | 15.53 | 5.17 | 4.82 |

Result: The "double-Y"-fiber having a titer of 6.5 dtex has an increased absorption and expansion capacity as compared to the simple Y-fiber of 3.3 dtex. The values of water holding capacity and water retention capacity have hardly been changed. However, an increase in the expansion speed as strong as in the simple Y-fiber with a titer of 6.4 dtex is not possible.

With the higher fiber titer of the "double-Y"-fiber (10.7 dtex), both advantages can be combined. The "double-Y"-fiber of 10.7 dtex exhibits the same advantageous expansion speed as does the simple Y-fiber of 6.4 dtex (the same thickness of the basic Y-shapes as in the simple Y-fiber of 6.4 dtex).

At the same time, the absorption capacity without pressure (WHV) and, respectively, under a physiological pressure (Syngina measurement) remains at least at the same high level as that of the original simple Y-fiber of 3.3 dtex (the additional absorption through prefabricated hollow spaces compensates for the coarser pore structure).

Example 3

Figure 8:
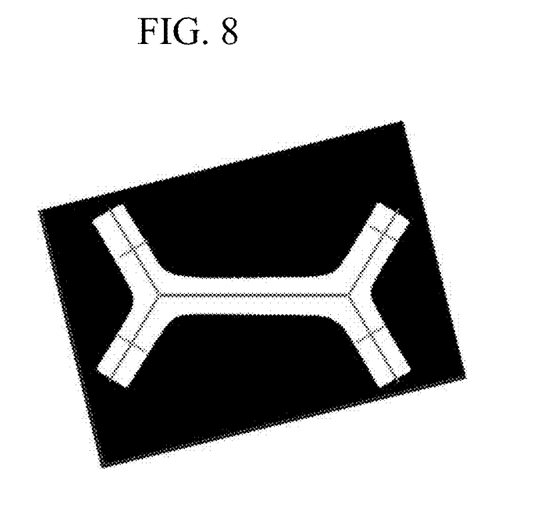
FIG. 8 schematically shows the cross-section of an opening of a spinneret which is used for the production of fibers according to the invention.

Viscose was spun through a spinneret having openings which are schematically illustrated in FIG. 8. The spinning opening can be theoretically imagined as being composed of two three-limbed (trilobal) basic shapes.

In Example 3a), the width of the limbs of the openings in each case amounted to 20 μm, and the length of the free limbs (not connected to each other) amounted to 60 μm, which, in each case, was determined by starting at the conceptual center of the two basic shapes (see the thin lines in FIG. 8). By connecting the two basic shapes, a connecting limb having a length of 120 μm is formed (again determined as the distance between the centers of the two basic shapes).

In Example 3b), the width of the limbs of the openings in each case amounted to 25 μm, the length of the free limbs was in each case 75 μm, and the length of the connecting limb was approx. 140 μm.

Each spinneret comprised about 400 of those openings.

In the following, said spinnerets are also referred to as "YY"-dies and, respectively, the fibers spun therefrom are referred to as "YY"-fibers.

Viscose was spun through those dies and processed further as follows:
Drawing-off: 50 m/min
Main stretching: 25%
Titer adjustment: via throughput
Viscose: cellulose content: 9.6%
 NaOH content: 5.6%
 viscosity in falling-ball seconds: 38 s
 The viscose contained polyethylene glycol (PEG).
Aftertreatment: cut to 40 mm, suspension, washing, aftertreatment, drying in the drying cabinet.

Three individual YY-dies were in each case mounted to a die holder and spun out. In each test series, also a fiber having a normal trilobal cross-section was spun out in an otherwise equal manner according to EP 0 301 874 A. In the following, those fibers are referred to as "reference fibers".

Using the die openings according to Example 3a), YY-fibers having a titer of 3.29 dtex, 4.11 dtex and 4.93 dtex were spun by appropriately modifying the viscose throughput.

Using the die openings according to Example 3b), YY-fibers having a titer of 4.77 dtex, 5.96 dtex and 7.15 dtex were spun by appropriately modifying the viscose throughput.

The reference fibers in each case had a titer of 3.3 dtex.

Figure 9:
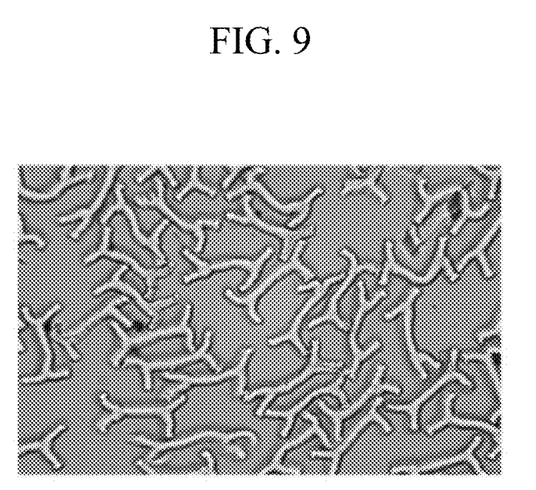
FIG. 9 shows a micrograph of cross-sections of fibers according to the invention.

FIG. 9 shows a micrograph of the YY-fibers according to Example 3b) with a titer of 5.96 dtex.

The cross-sectional images of the fibers show that the length of the connecting limb of the fibers produced is, in many cases, more than twice as great as the length of the free limbs. In order to ensure a ratio of the length of the connecting limb to the length of the free wings of at most 2.0, the middle bar in the spinneret opening would have to be shortened by another approx. 5%.

The properties of the produced fibers according to the invention were compared to those of reference fibers having a titer of 3.3 dtex. The fibers according to the invention displayed considerably improved properties in particular with regard to their Syngina absorbency (an absorbency higher by up to about 15%).

In a further test series, YY-fibers having a titer of 3.7 dtex, 4.11 dtex and 4.52 dtex (die design a)) and, respectively, of 5.36 dtex, 5.96 dtex and 6.56 dtex (die design b)) were produced in an analogous manner. Also in those fibers, Syngina absorbencies were detected which were improved in comparison to those of the reference fibers.

What is claimed is:

1. A regenerated cellulose fiber having a multi-limbed cross-section, wherein the cross-section is formed of at least two multi-limbed basic shapes, which basic shapes are connected, in each case at least at one of their limb ends, to a limb end of another basic shape and a length of the connecting limb resulting from connection of the two limb ends is longer than a length of a shortest limb(s) by a factor of at least 1.5, preferably of from 1.5 to 2.0, wherein the fiber has a titer that ranges from 2 dtex to 40 dtex.

2. The cellulose fiber according to claim 1, wherein the basic shapes are selected from the group consisting of Y-shaped basic shapes, X-shaped basic shapes and mixtures thereof.

3. The cellulose fiber according to claim 1, wherein the number of basic shapes connected to each other ranges from 2 to 10.

4. The cellulose fiber according to claim 3, wherein the number of basic shapes connected to each other ranges from 2 to 4.

5. The cellulose fiber according to claim 1, wherein the cross-section exhibits at least one axis of symmetry.

6. The cellulose fiber according to claim 1, wherein at least a portion of the limbs has a ratio of length to width of from 2:1 to 10:1.

7. The cellulose fiber according to claim 6, wherein all the limbs have a ratio of length to width of from 2:1 to 10:1.

8. The cellulose fiber according to claim 1, wherein the fiber is selected from the group consisting of a staple fiber, a short-cut fiber and a filament tow.

9. The cellulose fiber according to claim 1, wherein, in the multi-limbed basic shapes, at least one of the limbs deviates in its length from the other limbs and a length of one or several limbs is greater than a length of the shortest limb(s) by a factor of 2 to 10.

10. A fiber bundle comprising a plurality of cellulose fibers according to claim 1.

11. A product comprising the fiber bundle according to claim 10, wherein the product is selected from the group consisting of absorbent products, sanitary products, filling materials, packings for foodstuff, papers, flock, clothing, and wound dressings.

12. The fiber bundle according to claim 10, wherein the cross-sections of the cellulose fibers are essentially equal.

13. A product comprising a regenerated cellulose fiber according to claim 1, wherein the product is selected from the group consisting of absorbent products, sanitary products, filling materials, packings for foodstuff, papers, flock, clothing, and wound dressings.

14. The product according to claim 13 or 11, wherein the sanitary product is selected from the group consisting of tampons, incontinence products, sanitary pads and panty liners.

15. The product according to claim 13 or 11, wherein the filling materials are for blankets, cushions and sleeping bags.

16. The product according to claim 13 or 11, wherein the packings are for meat products.

17. The product according to claim 13 or 11, wherein the papers are filer papers.

18. The product according to claim 13 or 11, wherein the clothing is inlay fleece.

19. The cellulose fiber according to claim 6, wherein the fiber has a titer that ranges from 6 dtex to 16 dtex.

20. A process for the production of a regenerated cellulose fiber and, respectively, of the fiber bundle according to claim 1, comprising the steps of
providing a viscose spinning mass
spinning the viscose spinning mass through at least one opening of a spinneret into a spinning bath, whereby filaments are formed,
wherein the opening of the spinneret is formed of at least two multi-limbed sub-openings, which sub-openings are connected, in each case at an end of at least one of their limbs, to an end of the limb of another sub-opening or come so close to said limb end that emerging filaments will interconnect at the limb ends which have been formed.

21. The process according to claim 20, wherein the spinneret comprises several openings, with all the openings having essentially the same arrangement of sub-openings.

* * * * *